Patented May 29, 1951

2,554,831

UNITED STATES PATENT OFFICE 2,554,831

METHOD OF PREPARING NITRO ESTERS

Milton C. Kloetzel, Los Angeles, Calif., assignor to Commercial Solvents Corporation, Terre Haute, Ind., a corporation of Maryland No Drawing. Application December 18, 1947, Serial No. 792,601

6 Claims. (Cl. 260—478)

My invention relates to new and useful nitro esters. More particularly, it is concerned with nitro esters having the following structural formula:

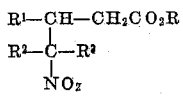

wherein R represents a lower alkyl group, $R^1$ is selected from the group consisting of hydrogen and —$CO_2$, $R^2$ is an alkyl group, and $R^3$ is selected from the group consisting of hydrogen and alkyl groups.

Nitro esters of the above type are readily prepared from primary or secondary mononitroalkanes of the general formula

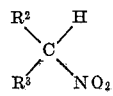

wherein $R^2$ is an alkyl group and $R^3$ is selected from the group consisting of hydrogen and alkyl groups; and an unsaturated ester of the general type:

wherein $R^1$ is selected from the group consisting of hydrogen and —$CO_2R$ in which R represents a lower alkyl group (i. e. containing 6 or less carbon atoms). This condensation is best brought about by the use of a weakly basic organic amine, such as a secondary or tertiary amine. Previous attempts to bring about a similar type of reaction are recorded in the following references: Kohler and Darling, J. Am. Chem. Soc., 52, 1174 (1930); Kohler and Engelbrecht, J. Am. Chem. Soc., 41, 764 (1919); Kohler, J. Am. Chem. Soc., 38, 889 (1916). These investigators found that the sodium salts of certain primary nitroalkanes could be caused to add to alpha, beta-unsaturated esters. However, they stated that piperidine and other feebly basic materials would not induce the condensation of a primary nitroalkane with alpha, beta-unsaturated esters. I have found that the nitro esters described above can be obtained in good yield by bringing about the aforesaid condensation by the use of secondary or tertiary amines such as triethylamine or diethylamine.

The reaction is carried out by employing about one mole of ester to three moles of mononitroalkane to preferably about one-half mole of triethyl or other tertiary amine. If diethyl or other secondary amine is used as a catalyst, the proportion should be about one mole of ester to three moles of mononitroalkane to not substantially in excess of two-tenths of a mole of amine. The preferred reaction temperature is about 20°–30° C. and the time of reaction depends upon the nitroalkanes employed and may vary with the individual reactants as indicated by the examples which follow.

The reaction is carried out by mixing the ingredients in a suitable vessel and allowing the reaction mixture to stand for a period of time which may range from one to forty-five days depending upon the particular reactants employed. After completion of the reaction the unchanged nitroalkane and unused amine are distilled off. The residue is then purified by vacuum distillation in the case of products which are liquids at room temperature, or by recrystallization from a suitable solvent if the products are solid at room temperature.

Examples of nitroalkanes suitable for use in my process include nitroethane, 1-nitropropane, 1-nitrobutane, 2-nitropropane, 2-nitrobutane, nitropentane, nitrohexane, and phenylnitromethane. The esters which have been found to be suitable for use in my process are the lower alkyl acrylates, fumarates, and maleates, such as for example: ethyl acrylate, methyl acrylate, ethyl fumarate, methyl fumarate, ethyl maleate, and methyl maleate. I have found that either tertiary or secondary amines such as, for example, the trialkyl- and dialkyl-amines may be satisfactorily employed. Examples of suitable amines include diethylamine, triethylamine, tripropylamine, N-methylpiperidine and the like. When secondary amines, such as diethylamine, are employed they should be used in relatively small concentration, in order to avoid side reactions. Tertiary amines may be used in amounts in excess of about 0.2 mole per mole of ester being reacted, the exact proportion used being determined largely by the speed of reaction desired and the economics of the operation.

My invention may be further illustrated by the following specific examples.

Example I

When 86 grams of methyl acrylate were mixed with 225 grams of nitroethane and 50.8 grams of triethylamine at room temperature, there was a mild evolution of heat and the solution quickly became yellow-green. Within thirty-six hours the color of the solution changed to brown-orange. After standing at 30° C. for four days, the mixture was subjected to reduced pressure distillation to remove unreacted reagents (to 50° C. at 13 mm.). Vacuum distillation of the residue yielded 105.7 grams of yellow oil (66%) boiling at 107–113° C. at 3.5–4.8 mm. Decomposition appeared to take place toward the end of the distillation. The pure colorless methyl 4-nitropentanoate (97.3 grams) was obtained by distillation at 88–89° C. at 2 mm.; $N_D^{20}$ 1.4359;

$$d_{20}^{20}\ 1.1398$$

The ester has a faint camphoraceous odor. Analysis for $C_6H_{11}NO_4$ was: theoretical, N, 8.69; found, N, 8.84.

Example II

A mixture of 28.7 grams of methyl acrylate, 89.1 grams (3 moles) of 2-nitropropane and 16.85 grams (0.5 mole) of triethylamine was mixed at room temperature and then allowed to stand at 30° C. After four days the resulting green solution was subjected to reduced pressure distillation to remove unreacted reagents, and the residue was distilled in vacuum; yield, 47.3 grams (81%) of methyl 4-methyl-4-nitropentanoate; having a boiling point of 90°–93° C. at 1.5 mm. The yield was raised to 86% by employing a reaction period of seven days. Pure methyl 4-methyl-4-nitropentanoate was obtained as a colorless, pleasant-smelling oil boiling at 77–78.5° C. at 1.3 mm.; $n_D^{20}$ 1.4419;

$$d_{20}^{20}\ 1.1166$$

Analysis for $C_7H_{13}NO_4$ was: theoretical, N, 7.99; found, N, 8.07.

Example III

To a suspension of 36 grams of dimethyl fumarate in 66.8 grams (3 moles) of 2-nitropropane was added 7.6 grams (0.3 mole) of triethylamine at room temperature, and the mixture allowed to stand at 30° C. for 43 days. When the resulting green reaction mixture was fractionated, there was obtained 49.5 grams (85%) of faintly-green methyl (1-nitroisopropyl)-succinate. The boiling point was 118–120° C. at 1.8 mm. The nitro ester crystallized completely upon cooling and separated from a mixture of ether and petroleum ether (B. P. 60–75° C.) in colorless rectangular plates; M. P. 35.5–36° C. Analysis for $C_9H_{15}NO_6$ was: theoretical, C, 46.34; H, 6.48; N, 6.00; found, C, 46.58; H, 6.08; N, 6.38.

Example IV

A mixture of 36 grams of dimethyl fumarate, 66.8 grams (3 moles) of 1-nitropropane and 7.5 grams (0.3 mole) of triethylamine was mixed at room temperature and allowed to stand at 30° C. for five days. It was then worked up in the usual manner (after first being cooled to 0° C. and filtering off 4.5 grams of solid, unreacted dimethyl fumarate). After four fractionations, the methyl (1-nitropropyl)-succinate was obtained in amounts of 22.8 grams. It distilled at 125–126° C. at 1.5 mm. Analysis for $C_9H_{15}NO_6$ was: theoretical, N, 6.00; found, N, 6.51.

Example V

A solution of 14.4 grams of dimethyl maleate and 0.73 gram of diethylamine in 9.3 grams of 2-nitropropane became hot when mixed and slowly began to deposit colorless crystals of dimethyl fumarate after standing at 30° C. for thirty minutes. After seven hours, 11.6 grams of dimethyl fumarate, M. P. 102–103° C., was obtained by filtration, and another crop (0.3 gram), obtained by concentrating and cooling the mother liquor; total yield in this isomerization was 83%. When the precipitated dimethyl fumarate was allowed to remain in contact with the 2-nitropropane and diethylamine, it slowly redissolved, and methyl (1-nitroisopropyl)-succinate was produced in the manner described above.

The nitro esters of my invention are useful as intermediates in the preparation of numerous valuable organic compounds and compositions. Additional uses of these products will readily occur to those skilled in the art.

Example VI

To a suspension of 36 grams of dimethyl fumarate in 66.8 grams of 2-nitropropane was added 3.65 grams of diethylamine, and the mixture was allowed to stand at 30° C. for six days. When the green reaction mixture was fractionated there was obtained 1.8 grams of crude yellow N-nitrosodiethylamine, (B. P. 73–80° C. at 17 mm.), 7.2 grams of nearly colorless dimethyl teraconate and 46.5 grams (80%) of faintly green methyl (1 - nitroisopropyl) - succinate, (B. P. 118–120° C. at 1.8 mm.).

My invention now having been described, what I claim is:

1. In a process for the preparation of nitro esters of the formula

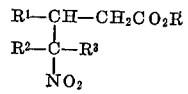

wherein R is a lower alkyl group, $R^1$ is selected from the group consisting of hydrogen and —$CO_2R$, $R^2$ is an alkyl group and $R^3$ is selected from the group consisting of hydrogen and alkyl groups, the step which comprises causing primary and secondary mononitroalkanes to react with an ester selected from the group consisting of alkyl acrylates, alkyl fumarates, and alkyl maleates, in the proportions of three moles of nitroalkanes per mole of ester, in the presence of a weakly basic organic amine selected from the group consisting of secondary and tertiary amines, said secondary amines being used in proportions of not substantially in excess of 0.2 mole per mole of ester and three moles of nitroalkanes, and said tertiary amines being used in the proportions of about 0.5 mole per mole of ester and three moles of nitroalkane.

2. The process of claim 1 wherein the amine is triethylamine.

3. In a process for the preparation of methyl 4-nitropentanoate, the step which comprises causing methyl acrylate and nitroethane to react in the presence of triethylamine at a temperature of about 20–30° C., said triethylamine being used in the proportion of about 0.5 mole per one mole of methyl acrylate and three moles of nitroethane.

4. In a process for preparing methyl 4-methyl-4-nitropentanoate, the step which comprises causing methyl acrylate and 2-nitropropane to react in the presence of triethylamine at about 20–30° C., said triethylamine being used in the proportion of about 0.5 mole per one mole of methyl acrylate and three moles of 2-nitropropane.

5. In a process for the preparation of methyl (1-nitroisopropyl)-succinate, the step which comprises causing 2-nitropropane and dimethyl fumarate to react at about 20–30° C. in the presence of triethylamine, said triethylamine being used in the proportion of about 0.5 mole per one mole of dimethylfumarate and three moles of 2-nitropropane.

6. In the process for preparing methyl (1-nitropropyl)-succinate, the step which comprises causing dimethyl fumarate and 1-nitropropane to react in the presence of triethylamine at about 20–30° C., said triethylamine being used in the proportion of about 0.5 mole per one mole of dimethylfumarate and three moles of 1-nitropropane.

MILTON C. KLOETZEL.

REFERENCES CITED

The following references are of record in the file of this patent:

UNITED STATES PATENTS

| Number | Name | Date |
|---|---|---|
| 2,342,119 | Bruson | Feb. 22, 1944 |
| 2,390,918 | Bruson | Dec. 11, 1945 |